United States Patent [19]
Ono et al.

[11] Patent Number: 5,213,126
[45] Date of Patent: May 25, 1993

[54] PRESSURE CONTROL VALVE AND METHOD OF MANUFACTURING SAME

[75] Inventors: Tomohiro Ono, Ohta; Katsuya Shirasaki, Kiryu, both of Japan

[73] Assignee: Mitsuba Electric Manufacturing Co., Ltd., Gunma, Japan

[21] Appl. No.: 878,722

[22] Filed: May 5, 1992

[30] Foreign Application Priority Data

May 15, 1991 [JP] Japan ................................ 3-139762
May 27, 1991 [JP] Japan .............................. 3-47413[U]

[51] Int. Cl.⁵ .......................................... F16K 31/365
[52] U.S. Cl. ...................................... 137/15; 137/510
[58] Field of Search ............... 137/509, 510, 15, 315; 123/463, 447, 457

[56] References Cited

U.S. PATENT DOCUMENTS 4,606,367 8/1986 Britt ..................................... 137/15
4,936,342 6/1990 Kojima et al. ...................... 137/510

FOREIGN PATENT DOCUMENTS

3-17486 2/1991 Japan .

*Primary Examiner*—Stephen M. Hepperle

[57] ABSTRACT

In a method of manufacturing a pressure control valve wherein a fuel introduction path and a fuel discharge path are formed on a housing, a spherical valve body mounting portion is formed in the fuel discharge path and a spherical valve body is mounted on the valve body mounting portion, the spherical valve body itself is used as a jig for forming a valve seat surface, a pushing force is applied to the spherical valve body mounted on the spherical valve body mounting portion to punch it to form a valve seat surface having a concave spherical surface meeting a convex spherical surface of the spherical valve body is formed on a wall surface of the housing produced by aluminium die cast. An annular stepped portion is formed on the boundary between a valve seat surface of the spherical valve body mounting portion and a valve spring mounting portion.

4 Claims, 9 Drawing Sheets

PRESSURE CONTROL VALVE AND METHOD OF MANUFACTURING SAME

BACKGROUND OF THE INVENTION

1. Field of the Invention

This invention relates to a method of manufacturing a pressure control valve, more particularly to improvements in a method of manufacturing a valve seat surface in this pressure control valve, and for example, a method of manufacturing a pressure control valve, which is effective for use in techniques for manufacturing a fuel pressure control valve for controlling a fuel supply flow rate in accordance with fuel pressure.

2. Related Art Statement

In general, in a vehicle such as a motor vehicle, there has been used a fuel pressure control valve provided with a housing produced by die casting in a fuel supply path for delivering fuel in a fuel tank to an engine.

In the housing this type in the fuel pressure control valve, the housing constituting a control valve chamber together with a diaphragm is formed with a fuel introduction path and a fuel discharge path, which are communicated with the control valve chamber, and a valve body is mounted to the inlet side of the fuel discharge path. It is known a valve body using a ball (spherical valve body) as this valve body (Refer to Japanese Utility Model Laid-Open No. 3-17486 and U.S. Pat. No. 4,936,342 for example).

In the fuel pressure control valve in which the ball is used as the valve body, when the ball as being the valve body is mounted in the fuel discharge path, the ball is tightly attached to a valve seat surface to secure the sealing property, so that it becomes necessary to form a concave spherical seat valve surface on a valve body mounting portion of the fluid discharge path.

Then, with the method of manufacturing the pressure control valve of this type, in general, it is conceived that, when the valve seat surface is formed in the fuel discharge path, a spherical jig having the same shape as the ball is inserted into the valve body mounting portion, whereby the jig is punched to form the concave spherical surface on a contact surface between the jig and the valve body mounting portion.

However, with the method of manufacturing the pressure control valve of this type, there is such a risk that, when the jig is worn out, the shape of the jig becomes different from the shape of the ball as being the spherical valve body, whereby, even if the jig is punched, the sealing property may be lowered. Because of this, punching should be made while the shape of the jig is measured constantly, so that cost is required for the maintenance of the jig. Furthermore, cost is required for manufacturing the jig itself.

Furthermore, with the fuel pressure control valve this type, when the jig is punched to form the concave spherical seat valve surface on the contact surface between the jig and the valve body mounting portion, burrs inwardly directed in the radial direction may be produced on an end portion of the valve seat surface. These burrs are brought into a state of being projected into a path of a valve spring for biasing the ball toward a diaphragm, whereby such a case may occur that the burrs are raised to the ball side by the valve spring. When the burrs are raised to the ball side as described above, the forward ends of the burrs are projected farther than the seat valve surface. When the burrs are brought into the state of being projected as described above, contact between the ball and the valve seat surface is interfered by these burrs, whereby an interval occurs between the ball and the valve seat surface, so that the sealing property is lowered.

SUMMARY OF THE INVENTION

An object of the present invention is to provide a pressure control valve capable of preventing the lowering of the sealing property between a spherical valve body and a valve seat surface by burrs formed on the valve seat surface during working on the valve seat surface.

Another object of the present invention is to provide a method of manufacturing a pressure control valve capable of forming a valve seat surface meeting the shape of a spherical valve body on a housing while improving the productivity.

According to the present invention, the pressure control valve, wherein a liquid introduction path and a fluid discharge path, which are communicated with a control valve chamber, are formed on a housing constituting the control valve chamber together with a diaphragm; a spherical valve body mounting portion mounted thereon with a spherical valve body interlocked with the diaphragm is formed at the inlet side of the fluid discharge path; and a spring mounting portion mounted thereon with a spring for biasing the spherical valve body toward the diaphragm is formed in the fluid discharge path adjoining the spherical valve body mounting portion; is characterized in that an annular stepped portion is formed on a boundary between the spring mounting portion and the spherical valve body mounting portion.

In the above-described pressure control valve according to the present invention, the annular stepped portion is formed between the concave valve body seat and the spring mounting portion, whereby, when burrs are produced on the valve seat surface, the burrs are prevented from projecting from the stepped portion into the spring path, so that the burrs and the spring are prevented from contacting each other. Because of this, the burrs are not raised toward the inner periphery of the spherical valve body by the spring, so that the sealing property can be prevented from lowering by the burrs.

Furthermore, according to the present invention, the method of manufacturing the pressure control valve, wherein a fluid introduction path and a fluid discharge path, which are communicated with a control valve chamber, are formed on a substantially cup-shaped housing constituting the control valve chamber together with a diaphragm; a spherical valve body is interacted with the diaphragm; a valve body mounting portion mounted thereon with a valve body is formed on an inlet side of the fluid discharge path at a position to be faced to a diaphragm mounting opening portion; and a case is provided on a diaphragm mounting opening portion for covering a diaphragm, characterized in that a resilient member for rendering a biasing force to the spherical valve body is inserted into the fluid discharge path from the opening portion side of the housing for mounting the diaphragm; subsequently, the spherical valve body is inserted into the spherical valve body mounting portion of the fluid discharge path; a pushing force is applied to the spherical valve body from the opening portion side of the housing for mounting the diaphragm to punch a contact surface of the spherical valve body mounting portion with the spherical valve body; and a concave spherical valve seat surface is formed by this punching on the contact surface of the spherical valve body mounting portion with the spherical valve body.

In the above-described method of manufacturing the pressure control valve according to the present invention, the spherical valve body itself is used as the jig, and the pushing force is applied to the spherical valve body inserted into the spherical valve body mounting portion of the fluid discharge path to punch the contact surface between the spherical valve body and the spherical valve body mounting portion, to thereby form the concave valve seat surface, so that the valve seat surface meeting the shape of the spherical valve body can be accurately formed. Furthermore, the consideration of the wear of the jig and the manufacture of the jig can be dispensed with, so that the productivity can be improved.

BRIEF DESCRIPTION OF THE DRAWINGS

The above and other objects and features of the present invention will become more apparent when referred to the following descriptions given in conjunction with the accompanying drawings, wherein like reference numerals denote like elements, and in which.

DETAILED DESCRIPTION OF THE PREFERRED EMBODIMENTS

Figure 6:
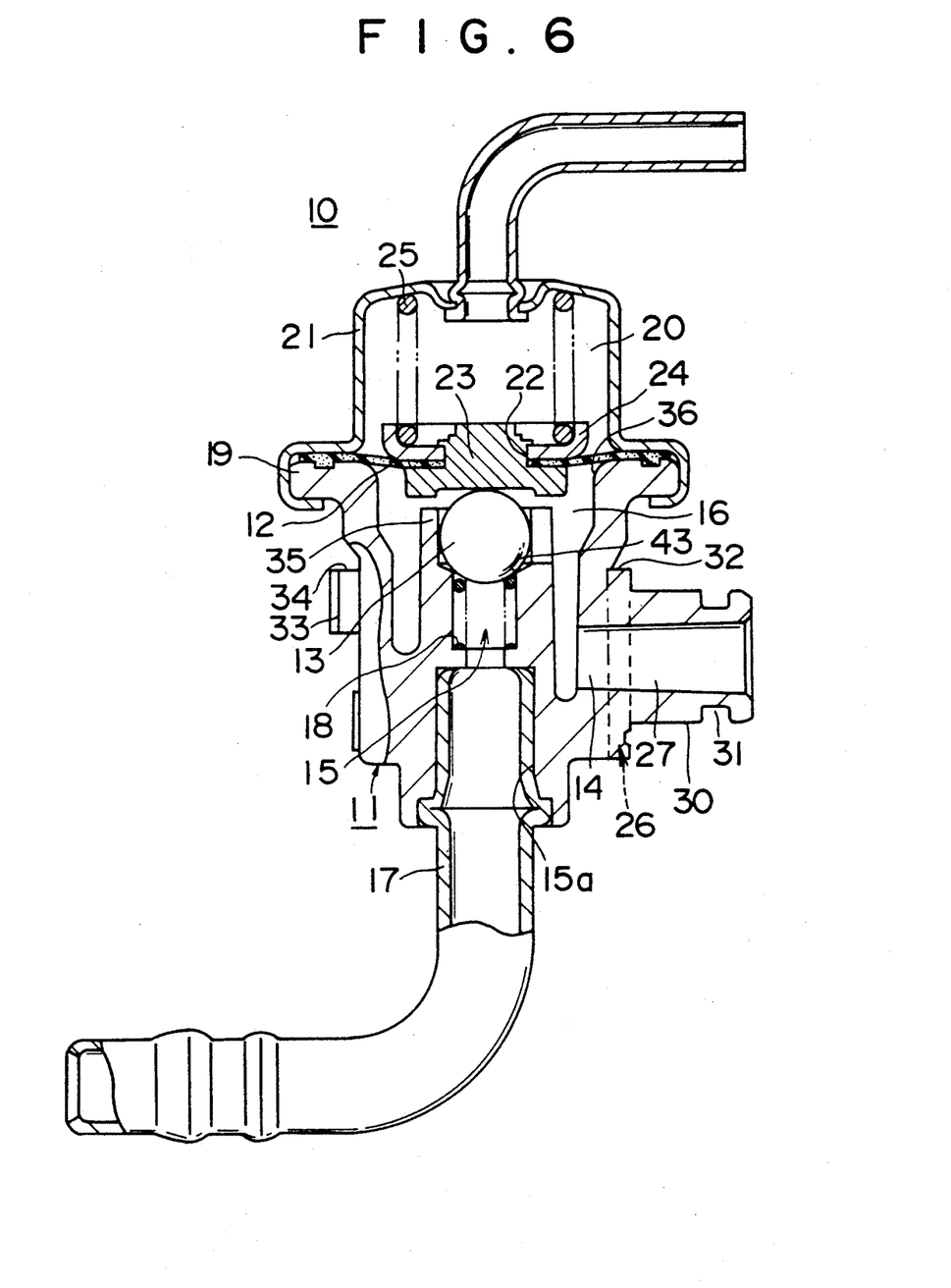
FIG. 6 is a side sectional view showing the fuel pressure control valve which has been manufactured.

Referring to the drawings, a fuel pressure control valve 10 according to this embodiment comprises a substantially cup-shaped housing 11 produced by die casting, a diaphragm 12 and a spherical valve body 13. Opened in the housing 11 are a fuel introduction path 14 and a fuel discharge path 15, between which a control valve chamber 16 is formed. Formed at the outlet side of the fuel discharge path 15 is a pipe press-in opening 15a, into which a return pipe 17 connected to a fuel tank is pressed. Then, coupled onto the intermediate portion of the fuel discharge path 15 is a valve spring 18 formed of a coil spring, and inserted into the inlet side of the fuel discharge path 15 is a spherical valve body 13. This spherical valve body 13 is formed of a steel ball, which may be referred simply to as a "ball", and mounted to or removed from a concave spherical valve seat surface 43 as will be described hereunder.

The diaphragm 12 defines a part of a wall surface of the control valve chamber 16, and is solidly secured to a flange portion 19 of the housing 11 together with a case 21 constituting an atmospheric chamber 20. Opened in the central portion of this diaphragm 12 is a holding hole 22, into which a receiver 23 is mounted. One end of the receiver 23 is abutted against the spherical valve body 13 and the other end is solidly secured to a support plate 24 abutted against the diaphragm 12. A return spring 25 formed of a coil spring is confined in an energy-stored state between the support plate 24 and an end surface wall of the case 21, the diaphragm 12 is constantly urged toward the spherical valve body 13 through the biasing force of the return spring 25 and adapted to push the spherical valve body 13 constantly through the biasing force of the return spring 25 in a direction closing the inlet side of the fuel discharge path 15.

Then, when the fuel is supplied into the control valve chamber 16 and the pressure in the control valve chamber 16 is raised, the diaphragm 12 is adapted to move to the atmospheric chamber 20 against the biasing force of the return spring 25. At this time, the spherical valve body 13 is moved to the diaphragm 12 to leave the valve seat surface 43, whereby the inlet side of the fuel discharge path 15 is opened. That is, the fuel introduction path 14 and the fuel discharge path 15 are brought into a valve-opened state where the both paths are communicated with each other through the control valve chamber 16.

Figure 7:
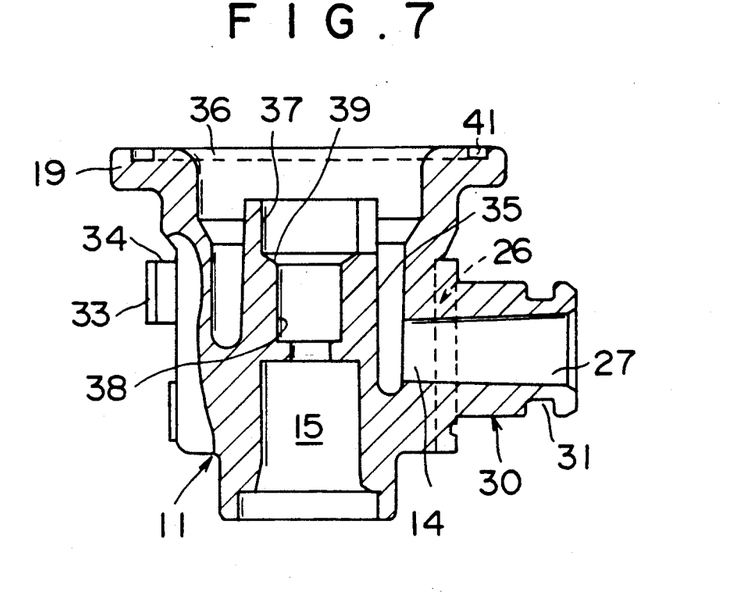
FIG. 7 is a side sectional view showing the housing.
Figure 8:
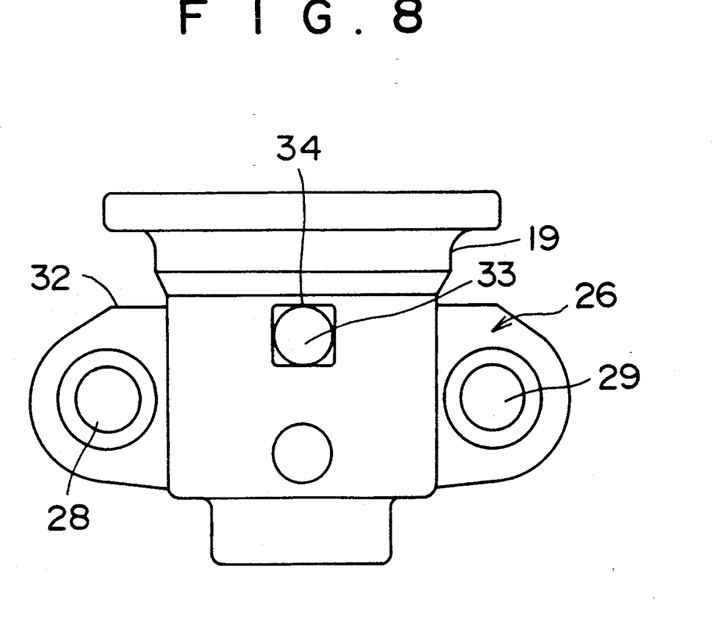
FIG. 8 is a rear view showing the housing.

Here, the arrangement of the housing 11 before the assembling will be described. As shown in FIGS. 7 and 8, outside the housing 11, a mounting flange 26 for mounting this fuel pressure control valve 10 to a machine frame or the like is integrally formed by die casting, and this mounting flange 26 is provided outside of the fuel introduction path 14 and projected integrally. This mounting flange 26 is formed of a substantially oval plate and projected bisymmetrically in a manner to intersect the center line of the fuel introduction path 14. Opened in the central portion of the mounting flange 26 is a through-hole 27 substantially constituting the fuel introduction path 14, and opened at both sides of the through-hole 27 are mounting holes 28 and 29, respectively. Integrally formed in a cylindrical shape at an edge of the through-hole 27 of the mounting flange 26 is a connecting opening portion 30 projecting in a direction of perpendicularly intersecting this mounting flange 26, and a retaining ring portion, i.e., a groove portion 31 for coupling a seat ring, not shown, is integrally formed at the forward end portion of this connecting opening portion 30.

Then, a first seat surface 32 is formed at an end surface of the mounting flange 26 on the side of the diaphragm in a plate shape in a direction of substantially perpendicularly intersecting the axis of the pipe press-in opening 15a. Furthermore, a boss 33 is bulgedly formed at the rear surface of the housing 11 on the side opposite to the mounting flange 26, and a second seat surface 34 is formed in a plate shape at an end face of this boss 33 on the side of the diaphragm in a direction of substantially perpendicularly intersecting the axis of the pipe press-in opening 15a similarly to the first seat surface 32 of the mounting flange 26. Further, these first seat surface 32 and second seat surface 34 are formed to constitute a substantially a coplanar surface.

On the other hand, in the housing 11 produced by aluminium die casting, a pole portion 35 for constituting the fuel discharge path 15 is formed at a position to face a diaphragm mounting opening portion 36. A spherical valve body mounting portion 37 and a valve spring mounting portion 38 are additionally provided at the side of the inner periphery of this pole portion 35 in a manner to substantially form the fuel discharge path 15. The inner diameter of the spherical valve body mounting portion 37 is determined to a dimension substantially equal to the pole portion, into which the spherical valve body (ball) 13 can be inserted, and a tapered portion 39 is formed on the boundary between the valve spring mounting portion 38 and the spherical valve body mounting portion 37.

Furthermore, a circular ring-shaped annular groove 41, into which a rib 40 of the diaphragm 12 can be pressed is formed on the surface of the flange portion 19 of the housing 11 integrally produced by aluminium die casting. In passing, the rib 40 of the diaphragm 12 is coaxially provided at the outer peripheral edge portion of the inner main surface of the diaphragm 12 integrally formed in a substantially disk shape, and integrally projected in a circular ring shape.

Next, description will be given of respective processes in which the concave spherical valve seat surface is formed on the tapered portion 39 of the housing 11 produced by aluminium die casting according to the above-described arrangement, and thereafter, the case 21 and the return pipe 17 are assembled to the housing 11, whereby the fuel pressure control valve 10 according to the above-described arrangement is manufactured.

Figure 1:
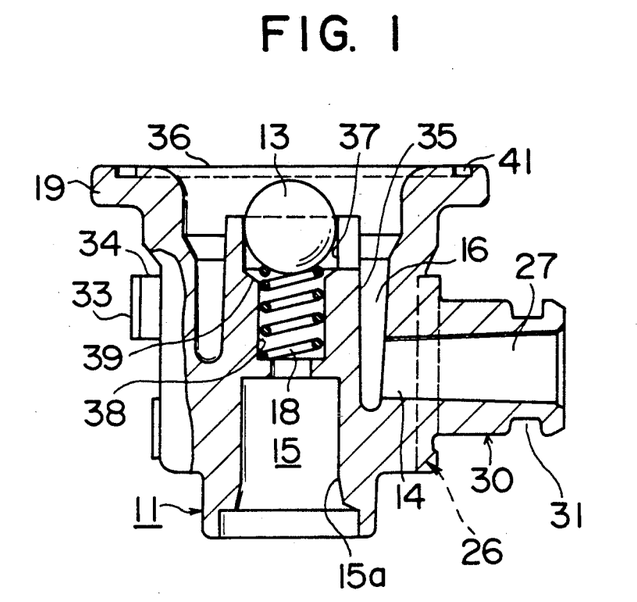
FIG. 1 is a side sectional view showing the process of mounting in the valve spring and the spherical valve body out of the method of manufacturing one embodiment of the fuel pressure control valve according to the present invention.

First, as shown in FIG. 1, the valve spring 18 is inserted into the valve spring mounting portion 38 from the side of the diaphragm mounting opening portion 36 of the housing 11, and subsequently, the ball (steel ball) as being the spherical valve body 13 is inserted into the spherical valve body mounting portion 37.

Figure 2:
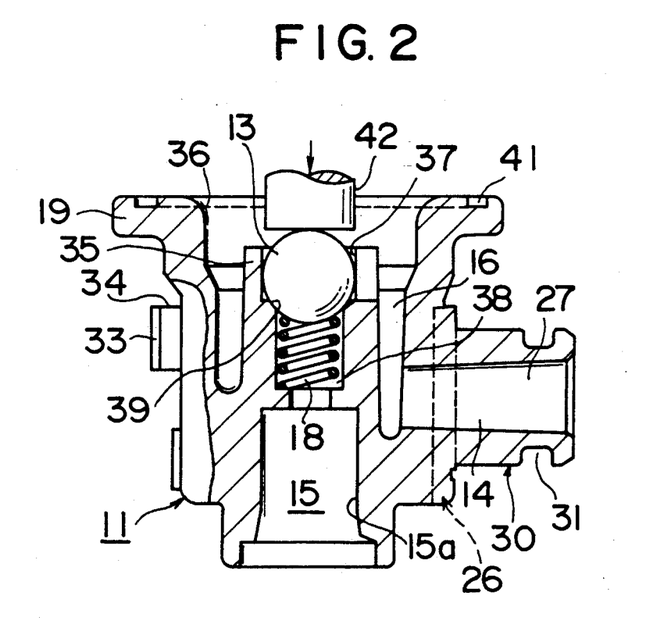
FIG. 2 is a side sectional view showing the process of forming the valve seat surface.

Next, as shown in FIG. 2, a cylindrical column-shaped jig 42 is inserted from the side of the diaphragm mounting opening portion 36, whereby the forward end of the jig 42 is brought into contact with the top surface of the spherical valve body 13. Then, pressure is applied to the spherical valve body 13 through the jig 42 to thereby apply the punching.

Figure 3:
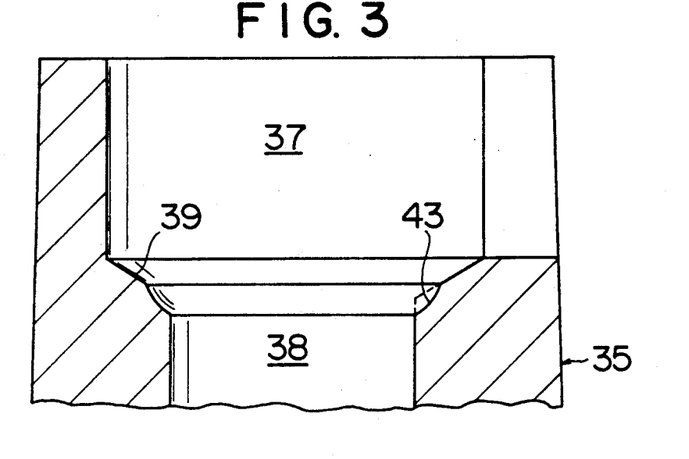
FIG. 3 is an enlarged partially sectional view showing the valve seat surface after forming.

By this punching, a concave spherical valve seat surface 43 as shown in FIG. 3 is formed on the tapered portion 39. That is, the ball (steel ball) as being the spherical valve body itself is used as a jig for forming the valve seat surface 43, whereby the concave spherical valve seat surface 43 is formed on the tapered portion 39 by the punching of the spherical valve body 13. With this operation, the concave spherical valve seat surface 43 meeting the convex spherical shape of the spherical valve body 13 is accurately formed on the tapered portion 39. At this time, the spherical valve body 13 is formed of the steel ball and the housing 11 is made of aluminium, so that the spherical valve body 13 can avoid damages.

Figure 4:
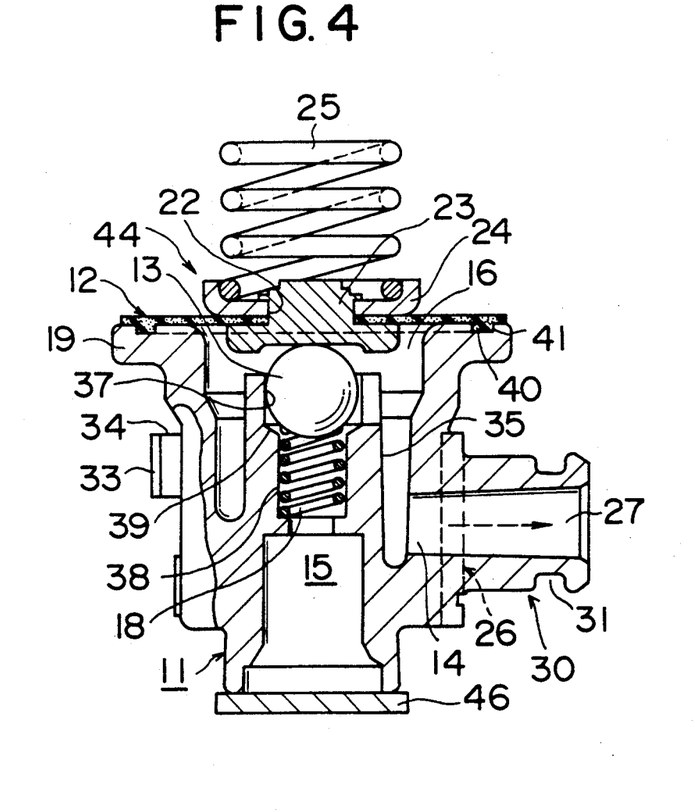
FIG. 4 is a side sectional view showing the process of assembling the diaphragm unit.

Next, as shown in FIG. 4, the outlet of the fuel discharge path 15 is blocked by a suitable blocking member 46, and the diaphragm unit 4 is rested such that the rib 40 of the diaphragm 10 is coupled into the annular groove 41 of the housing 11 in a state of being vacuum-sucked from the fuel introduction path 14. At this time, the pressure in the housing 11 is reduced, so that the diaphragm unit 4 is closely attached to the flange portion 9 of the housing 11, thereby preventing the shift in position.

A diaphragm unit 44 is a unit formed in such a manner that the receiver 23 and the support plate 24 are fixed to the diaphragm 12 and the return spring 25 is fixed to the support plate 24, and previously assembled in a separate process.

Figure 5:
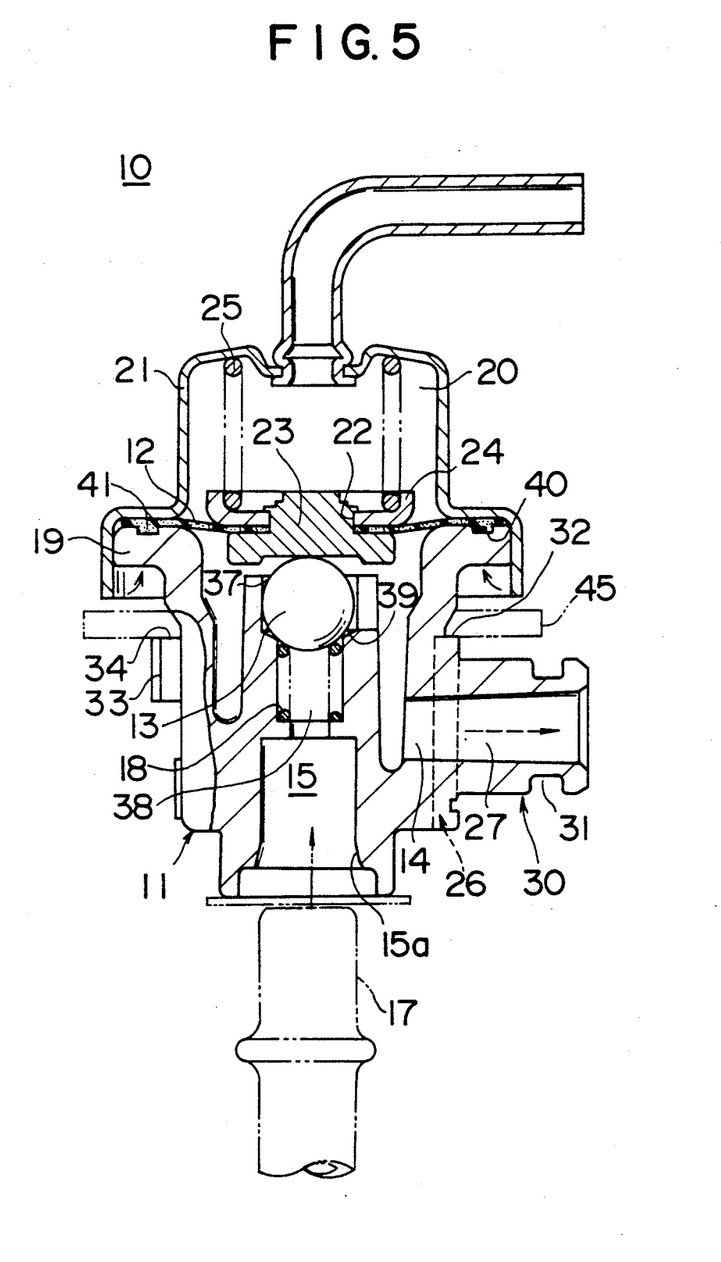
FIG. 5 is a side sectional view showing the process of caulking.

Next, as shown in FIG. 5, the case 21 put on the flange 19 of the housing 11 mounted thereon with the diaphragm unit 44 in a manner to cover the diaphragm unit 44 from above.

Subsequently, an end portion on the side of the opening end of the case 21 is caulked, whereby the case 21 is fixed to the flange portion of the housing 11.

In the covering process and the caulking process of the case 21, the rib 40 of the diaphragm 12 is vacuum-sucked from the fuel introduction path 14 and coupled into the annular groove 41 of the housing 11, whereby the case 21 is covered in a state where the diaphragm 12 is sucked to the flange portion 19 and caulked, so that a resilient force of the valve spring 18 is prevented from acting on the diaphragm 12 during the covering process and the caulking process. As a result, the diaphragm 12 can be prevented from a phenomenon of being bitten in between the case 21 and the flange portion 19, so that the caulking process can be carried out in a stabilized state.

After the case 21 is fixed to the housing 11 as described above, the vacuum-sucking is stopped. Then, as indicated by hypothetical lines in FIG. 5, a jig 45 is applied to the first seat surface 32 of the mounting flange 26 and the second seat surface 34 of the boss 33, whereby the return pipe 17 is pressed into the pipe press-in opening 15a of the housing 11.

At this time, a reaction force due to the pipe press-in acts on the jig 45 through the first seat surface 32 and the second seat surface 34, so that the stress acting on the diaphragm 12 and the like when the return pipe 17 is pressed in can be avoided. Because of this, even when the return pipe 17 is pressed into the pipe press-in opening 15a of the housing 11 after the case 21 is fixed to the flange portion 19 of the housing 11, a setting pressure set in the diaphragm 12 can be prevented from fluctuating.

Another embodiment of the present invention will hereunder be described with reference to FIGS. 9 to 14.

Figure 9:
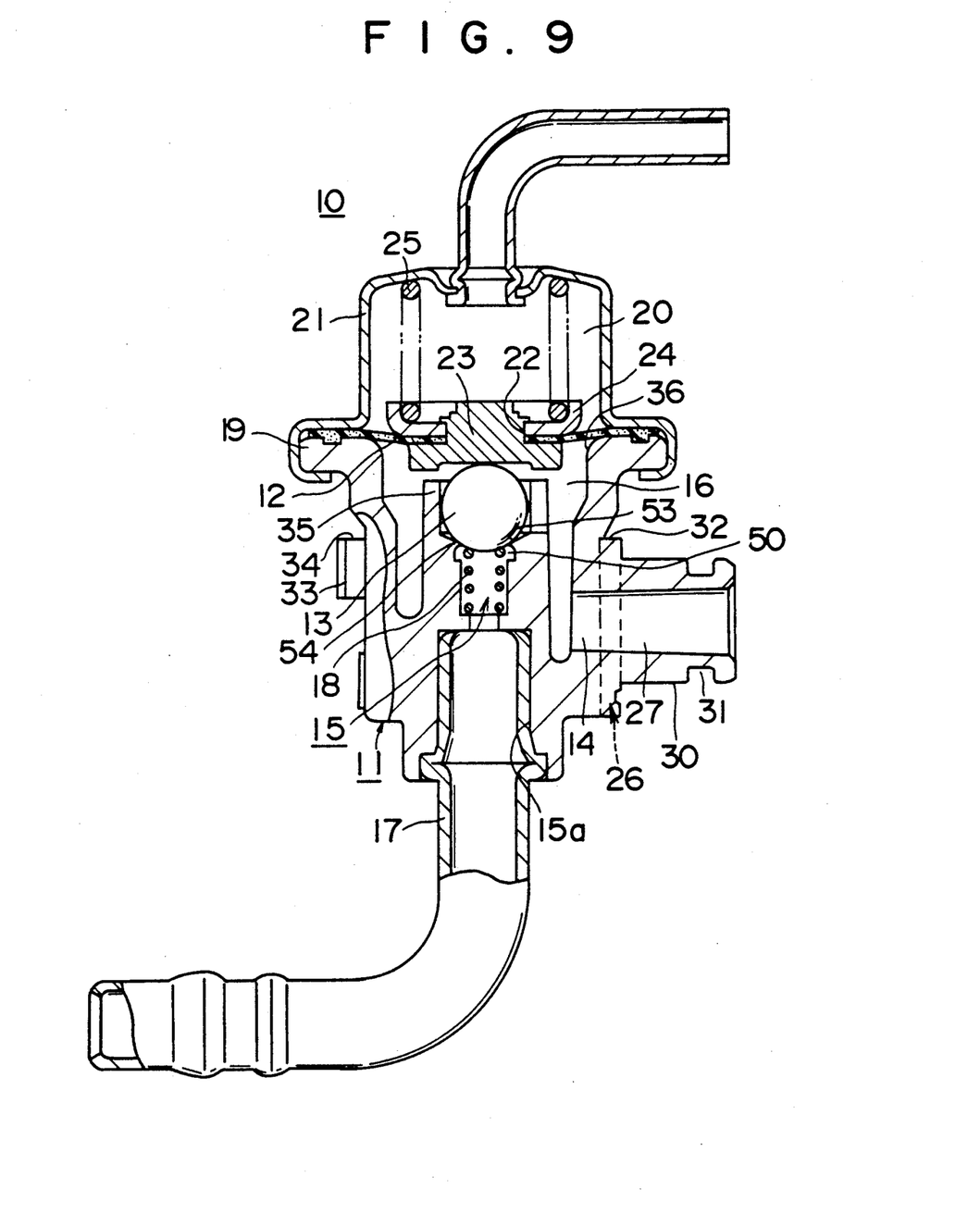
FIG. 9 is a side sectional view showing embodiment of the fuel pressure control valve according to the present invention.
Figure 10:
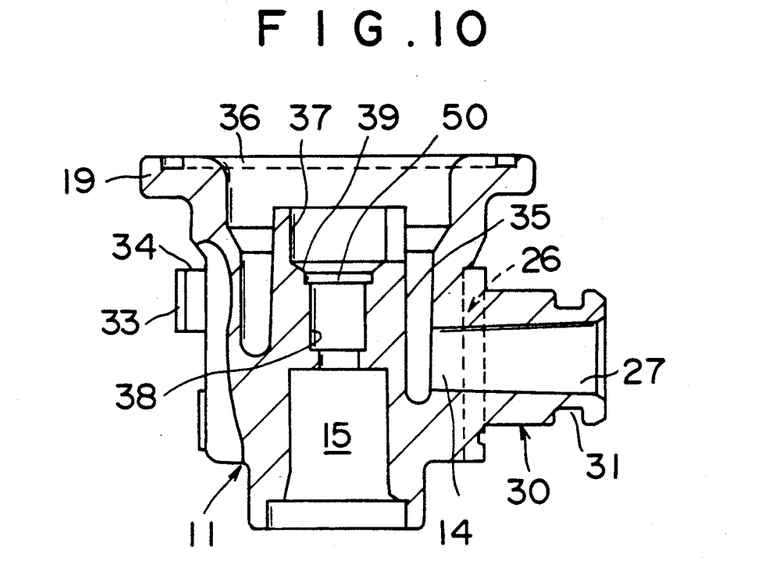
FIG. 10 is a side sectional view showing the housing.
Figure 11:
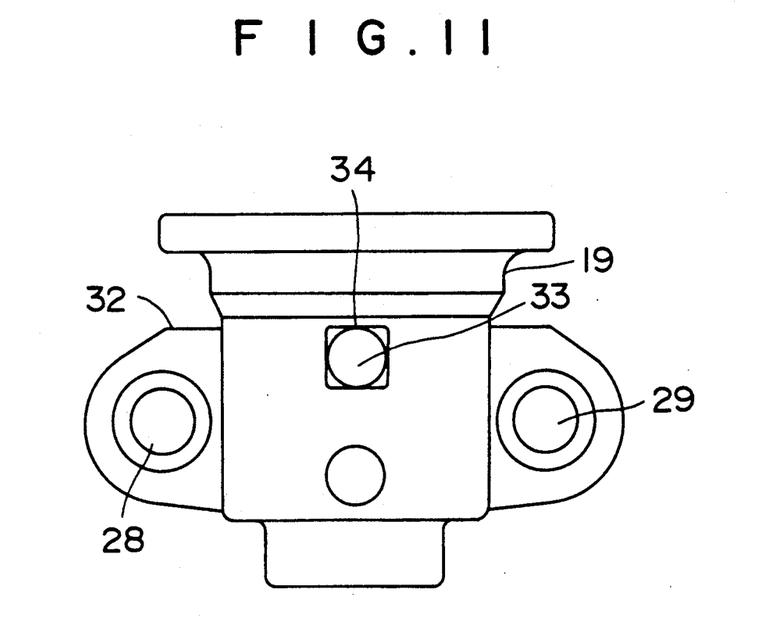
FIG. 11 is a rear view showing the housing.

In this embodiment, a stepped portion 50 for avoiding an interference between burrs 54 and the valve spring 18 as described hereunder is formed in a circular annulus on the boundary between the tapered portion 39 and the upper side edge of the valve spring mounting portion 38. That is, this stepped portion 50 is formed by integrally and simultaneously forming the valve spring mounting portion 38 to provide a double stepped hole shape at the time of producing the housing 11 by aluminium die casting. This stepped portion 50 is of such a circular hollow chamber shape that it has a diameter larger than the inner diamter of the valve spring mounting portion 38; smaller than the maximum diameter of the tapered portion 39, i.e., the inner diameter of the spherical valve body mounting portion 37; and is low in height.

Description will hereunder be given of respective processes in this embodiment, in which the concave spherical valve seat surface is formed on the tapered portion 39 of the housing 11 produced by aluminium die casting in the above-described arrangement, and thereafter, the case 21 and the return pipe 17 are assembled to the housing 11, whereby the fuel pressure control valve 10 with the above-described arrangement is manufactured.

Figure 12:
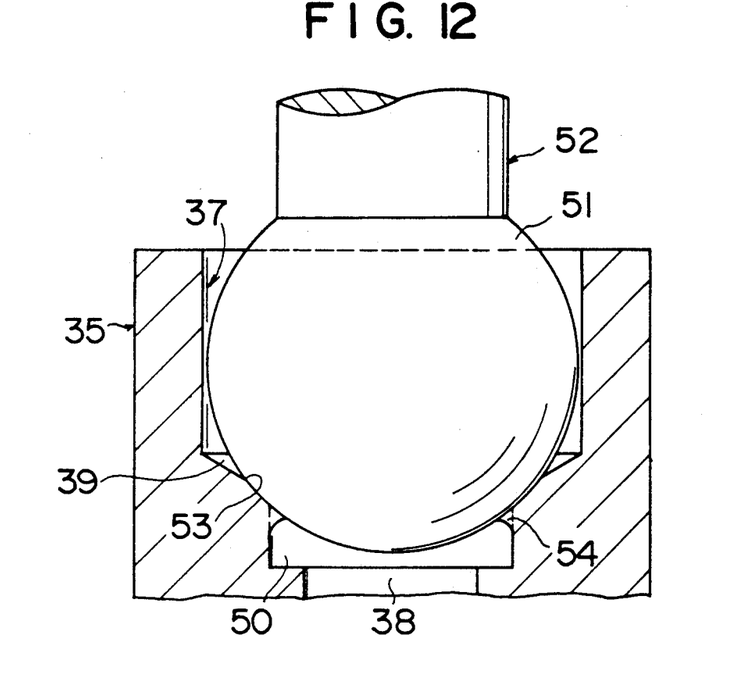
FIG. 12 is an enlarged partially sectional view showing the process of forming the valve seat surface.

First, as shown FIG. 12, a jig 52 provided at a head portion 51 with a ball (steel ball) corresponding in shape to the spherical valve body 13 is inserted into the spherical valve body mounting portion 37 from the side of the diaphragm mounting opening portion 36 of the housing 11. Then, pressure is applied to the tapered portion 39 of the spherical valve body mounting portion 37 through the ball head portion 51 of the jig 52 to thereby apply the punching.

Figure 13:
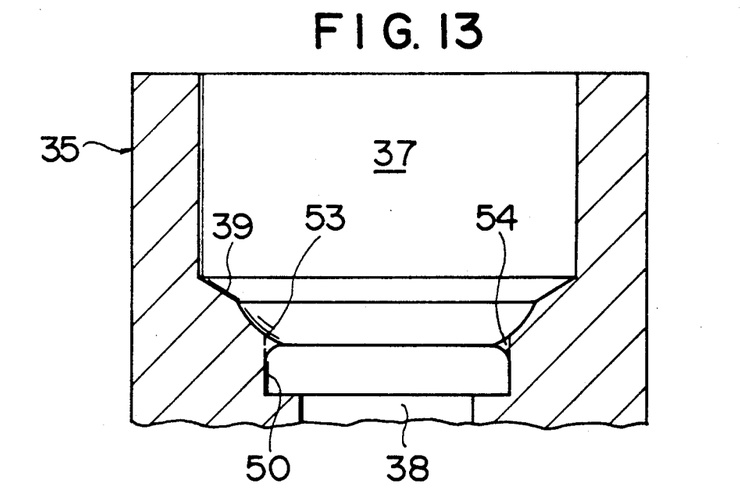
FIG. 13 is an enlarged partially sectional view showing the valve seat surface after forming.

By this punching, a concave spherical valve seat surface 53 meeting a convex spherical surface of the ball head portion 51 is formed on the tapered portion 39. At this time, as shown in FIGS. 12 and 13, even if radially and inwardly projecting burrs 54 are formed on the valve seat surface 53, the burrs 54 do not extend over the stepped portion 50 nor project to a position where they interfere with the valve spring 18 in the path of the valve spring 18 because the stepped portion 50 is embedded at the upper side edge of the valve spring mounting portion 38. In other words, even if the burrs 54 are formed on the valve seat surface 53 by the punching, the burrs 54 can be prevented from interfering with the valve spring 18. Accordingly, even if the burrs 54 are formed on the surface where the punching is applied, the burrs 54 are not raised to the side of the spherical valve body 13 by the valve spring 18. As a result, a state where an interval is formed between the spherical valve body 13 and the valve seat surface 53 can be avoided in advance, so that a state where the sealing property is lowered due to the presence of the interval can be prevented from occurring.

Next, the spherical valve body 13 is inserted into the spherical valve body mounting portion 37, thereafter, the outlet of the fuel discharge path 15 is blocked, and the diaphragm unit is rested on the housing 11 in a state where the fuel introduction path 14 is vacuum-sucked.

Figure 14:
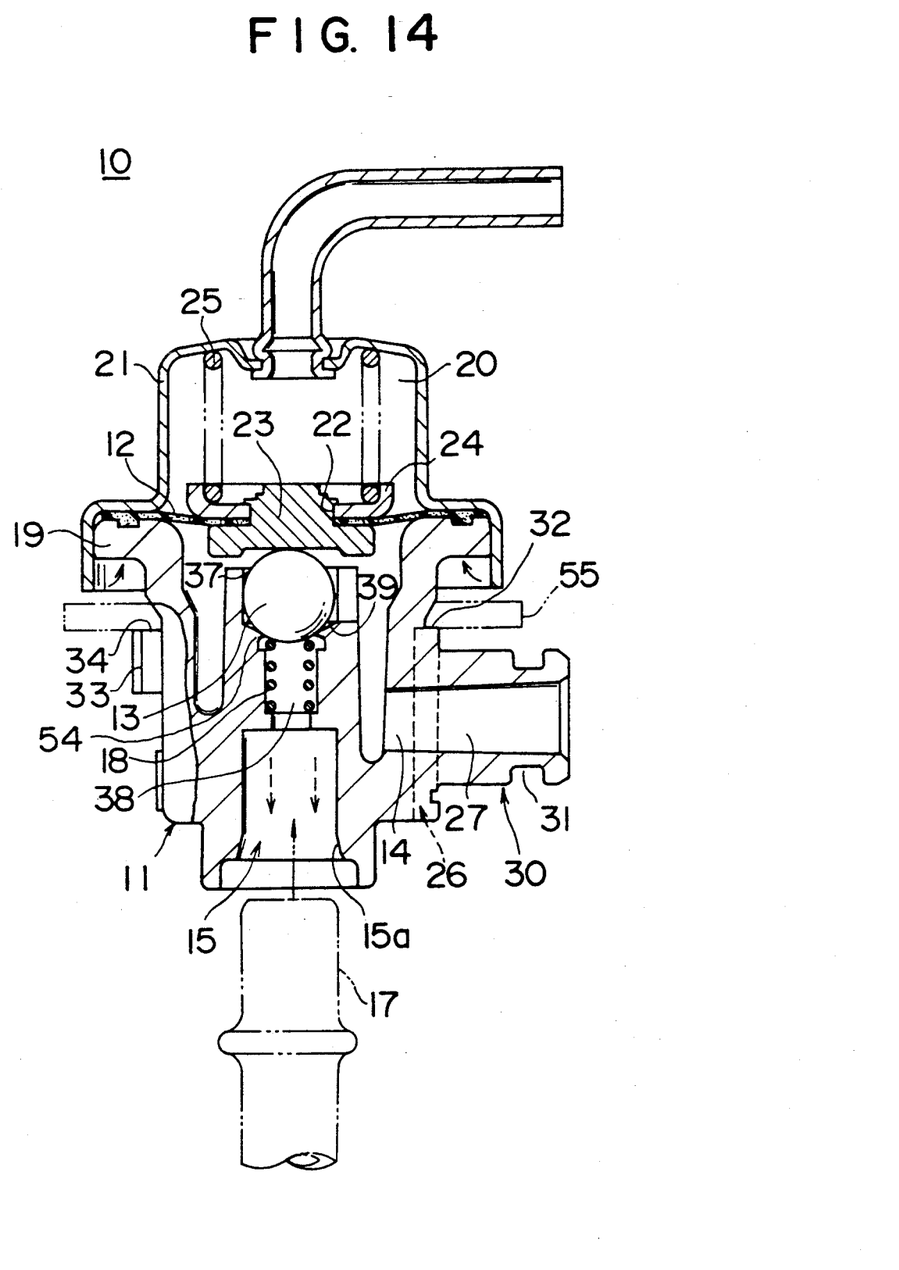
FIG. 14 is a side sectional view showing the process of assembling the diaphragm unit and the case.

Next, as shown in FIG. 14, the case 21 is put on the flange portion 19 of the housing 11 mounted thereon with the diaphragm unit in a manner to cover the diaphragm unit from above. Subsequently, an end portion at the opening side of the case 21 is caulked radially and inwardly, whereby the case 21 is fixed to the flange portion 19 of the housing 11.

In the covering process and the caulking process of the case 21, the case 21 is put on and applied thereto with caulking in a state where the fuel discharge path 15 is vacuum-sucked and the diaphragm unit is sucked onto the flange portion 19, so that the diaphragm 12 is positioned during the covering process and the caulking process, thereby preventing the shift in position. As a result, the phenomenon that the diaphragm 12 is bitten in between the case 21 and the flange portion 19 can be prevented from occurring, so that the caulking process can be carried out in the stabilized state.

After the case 21 is fixed to the housing 11 as described above, the vacuum suction is stopped. Then, as indicated by the hypothetical lines in FIG. 14, the jig 45 is applied to the first seat surface 32 of the mounting flange 26 and to the second seat surface 34 of the boss 33, whereby the return pipe 17 is pressed into the pipe press-in opening 15a of the housing 11.

At this time, the reaction force due to the pipe press-in acts on the jig 45 through the first seat surface 32 and the second seat surface 34, so that the stress acting on the diaphragm 12 and the like during the press-in of the return pipe 17 can be avoided. Because of this, even when the return pipe 17 is pressed into the pipe press-in opening 15a of the housing 11 after the case 21 is fixed to the flange portion 19 of the housing 11, the setting pressure set in the diaphragm 12 can be prevented from fluctuating.

Incidentally, the first seat surface 32 and the second seat surface 34 are used also during the caulking process of the case 21 to the housing flange portion 19. In this case too, the similar action and effect during the press-in of the return pipe 17 can be achieved.

Incidentally, the present invention should not be limited to the above embodiments, and can be variously modified within the scope of the invention.

For example, in the above embodiments, the method of manufacturing the fuel pressure control valve has been described, however, the present invention is applicable to the general methods of manufacturing the pressure control valves used for other applications.

As has been described hereinabove, according to the present invention, the spherical valve body itself is used as the jig for forming the valve seat surface, and the spherical valve body is punched, whereby the concave spherical valve seat surface meeting the convex spherical surface of the spherical valve body is formed on the spherical valve body mounting portion of the liquid discharge path, so that the concave spherical valve seat surface accurately meeting the convex spherical shape of the spherical valve body can be very easily formed.

Furthermore, the jig for forming the valve seat surface can be dispensed with, so that consideration of the jig for forming the valve seat surface can be omitted, the productivity can be improved and the cost reduction can be enhanced.

Further, according to the present invention, the annular stepped portion is formed on the boundary between the spring mounting portion of the liquid discharge path and the spherical valve body mounting portion, whereby the burrs formed on the valve seat surface can be prevented from interfering with the spring, so that, even when the burrs are formed on the valve seat surface, and the sealing property between the valve seat surface and the spherical valve body can be fully secured.

What is claimed is:

1. A pressure control valve comprising a housing having a diaphragm mounting opening portion, a diaphragm covering said diaphragm mounting opening portion with said housing and said diaphragm in combination defining a control valve chamber inside of said housing, said housing having a fluid introduction path and a fluid discharge path communicating with said control valve chamber, said housing also having a valve body mounting portion formed at the inlet side of said fluid discharge path and a spring mounting portion defining part of said fluid discharge path adjoining and extending from said valve body mounting portion in the direction toward the outlet side of said fluid discharge path, a spherical valve body mounted on said valve body mounting portion and interlocked between said valve body and said diaphragm, a spring for biasing said spherical valve body toward said diaphragm located in said spring mounting portion, a concave spherical valve seat formed on said valve mounting portion between said valve mounting portion and said spring mounting portion which concave seat is engagable with said spherical valve body to close said fluid discharge path, and said discharge path including an annular stepped portion located between said concave valve seat and said spring mounting portion.

2. The pressure control valve as set forth in claim 1, wherein said housing is produced by die casting.

3. The pressure control valve as set forth in claim 1, wherein said stepped portion is of a circular shape having a diameter larger than the inner diameter of said spring mounting portion no larger than the inner diameter of said concave valve seat.

4. A method of manufacturing a pressure control valve, wherein a fluid introduction path and a fluid discharge path, which are communicated with a control valve chamber, are formed on a substantially cup-shaped housing constituting the control valve chamber together with a diaphragm; a spherical valve body is interacted with the diaphragm; a valve body mounting portion mounted thereon with a valve body is formed on an inlet side of the fluid discharge path at a position to be faced to a diaphragm mounting opening portion; and a case is provided on a diaphragm mounting opening portion for covering a diaphragm, characterized in that a resilient member for rendering a biasing force to the spherical valve body is inserted into the fluid discharge path from the opening portion side of the housing for mounting the diaphragm; subsequently, the spherical valve body is inserted into the spherical valve body mounting portion of the fluid discharge path; a pushing force is applied to the spherical valve body from the opening portion side of the housing for mounting the diaphragm to punch a contact surface of the spherical valve body mounting portion with the spherical valve body; and a concaved spherical valve seat surface is formed by this punching on the contact surface of the spherical valve body mounting portion with the spherical valve body.

* * * * *